MULTICONTACT SEMICONDUCTOR TRANSLATING DEVICE

Filed Aug. 17, 1949 2 Sheets-Sheet 1

INVENTOR
R. J. KIRCHER
BY [signature]
ATTORNEY

July 7, 1953 R. J. KIRCHER 2,644,914

MULTICONTACT SEMICONDUCTOR TRANSLATING DEVICE

Filed Aug. 17, 1949 2 Sheets-Sheet 2

INVENTOR
R. J. KIRCHER
BY
ATTORNEY

Patented July 7, 1953

2,644,914

UNITED STATES PATENT OFFICE 2,644,914

MULTICONTACT SEMICONDUCTOR TRANSLATING DEVICE

Reymond J. Kircher, Summit, N. J., assignor to Bell Telephone Laboratories, Incorporated, New York, N. Y., a corporation of New York Application August 17, 1949, Serial No. 110,726

6 Claims. (Cl. 317—236)

This invention relates to semiconductor signal translating devices.

One general object of this invention is to simplify and reduce the cost of apparatus and circuits including semiconductor signal translating devices. More specifically, one object of this invention is to enable the performance of a variety of electrical functions with a compact unitary semiconductor device composed of a small number of elements.

In accordance with one feature of this invention, the translating device comprises a body of semiconductive material such as germanium or silicon and a plurality of electrical connections thereto, the connections being constructed and arranged to define with the body independent translating units operable simultaneously without interaction with each other. For example, the connections may be associated with the body in such manner as to define therewith amplifier and detector units or two amplifier units.

In one specific and illustrative embodiment of this invention, the device comprises a disc or wafer of N conductivity type high back voltage germanium which may be produced in the manner disclosed in the application, Serial No. 638,351, now Patent No. 2,602,211, filed December 29, 1945, of J. H. Scaff and H. C. Theuerer, having an ohmic or base connection to the periphery thereof. It comprises also a pair of point contacts bearing against one face of the disc or wafer and serving as emitter and collector connections which together with the base connection and the body define a semiconductor amplifier of the general type disclosed in the application, Serial No. 33,466, now Patent No. 2,524,035, filed June 17, 1948, of J. Bardeen and W. H. Brattain. The device comprises further a point contact bearing against the opposite face of the disc or wafer and constituting with the body and the base connection a rectifier or detector unit. The latter and the amplifier unit may be associated by appropriate external connections to constitute an audio frequency or radio frequency amplifier-detector combination or to define an amplifier with automatic volume control.

In another specific and illustrative embodiment of this invention, two pairs of point contacts are provided, each pair bearing against a respective face of the disc or wafer and constituting with the body and the base connection a triode amplifier unit of the general type aforementioned. The two amplifier units may be associated in cascade or push-pull relation.

The invention and the above-noted and other features thereof will be understood more clearly and fully from the following detailed description with reference to the accompanying drawing in which.

Figure 1:
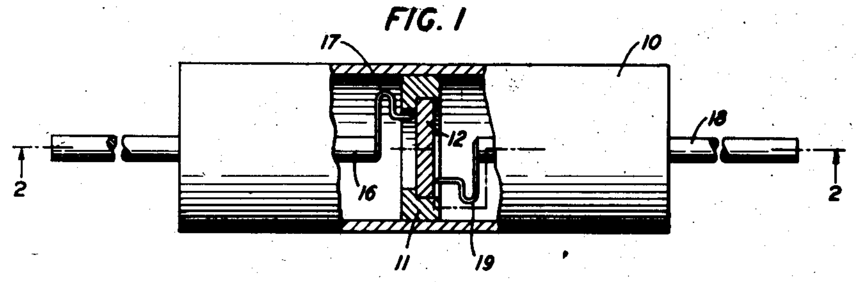
Fig. 1 is an elevational view partly in section of a semiconductor signal translating device illustrative of one embodiment of this invention and including amplifier and detector units.
Figure 2:
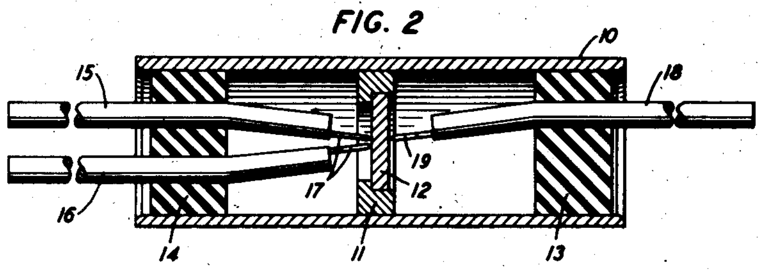
Fig. 2 is a sectional view of the device taken along line 2—2 of Fig. 1.

Referring now to the drawing, the signal translating device illustrated in Figs. 1 and 2 comprises a cylindrical metallic housing 10 and a metallic mounting ring 11 intermediate the ends of the housing 10 and affixed thereto, as by soldering, to be electrically integral therewith. Supported in a recess in the mounting ring 11 is a circular disc or wafer of semiconductive material which is joined to the ring 11 adjacent its periphery to provide a low resistance electrical connection between the ring and disc. For example, the ring 11 may be of brass and the disc or wafer 12 of germanium and secured to the ring as by a silver-based solder. Alternatively, the peripheral portion of the germanium disc may have thereon a plating of copper or nickel or rhodium which is soft soldered to the brass ring 11.

Affixed within the housing 10 at opposite ends thereof are a pair of insulating blocks or discs 13 and 14, for example, of polystyrene, which may be cemented to the housing or a resin compound which may be forced into the housing to a prescribed distance. The disc 14 has embedded therein a pair of leading-in conductors 15 and 16 each of which has affixed thereto a respective spring contact 17, the point of which may be chisel-edged and bears against one face of the semiconductive wafer 12. The other insulating disc 13 has embedded therein a leading-in conductor 18 which has connected thereto a spring contact 19, the pointed or chisel-shaped end of which bears against the opposite face of the semiconductive disc or wafer 12. The contacts 17 advantageously are of Phosphor bronze and contact 19 preferably of tungsten. As shown clearly in Fig. 1, advantageously the contact 19 bears against the semiconductive body at a region relatively remote from that in proximity to the contact point 17.

In a typical device, the semiconductive body 12 may be a disc of N-type germanium about 0.125 inch in diameter and 0.020 inch thick. The contacts 17 and 19 may be of 0.005 inch diameter material, for example, Phosphor bronze for contacts 17 and tungsten for contact 19, the contacts 17 having chisel points spaced 0.002 inch and the contact 19 having a conical point. The contact 19 may bear against the body at a region substantially diametral with respect to the points of contacts 17 and spaced of the order of .10 inch therefrom on the opposite surface.

The contact points 17 serve as emitter and collector connnections and constitute, together with the base connection defined by the ring 11 and the body 12, a triode amplifier unit of the type disclosed in the application of J. Bardeen and W. H. Brattain heretofore identified. The contact 19, together with the base connection and the body 12, constitutes a diode rectifier or detector unit. The two units, it has been found, may operate concurrently with no interaction therebetween through the body 12, in circuits where the body connection is common to the two units.

Figure 3:
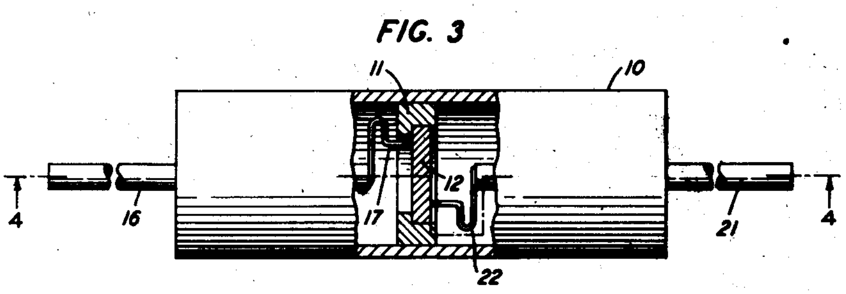
Fig. 3 is an elevational view similar to Fig. 1 of a translating device illustrative of another embodiment of this invention and comprising two amplifier units.
Figure 4:
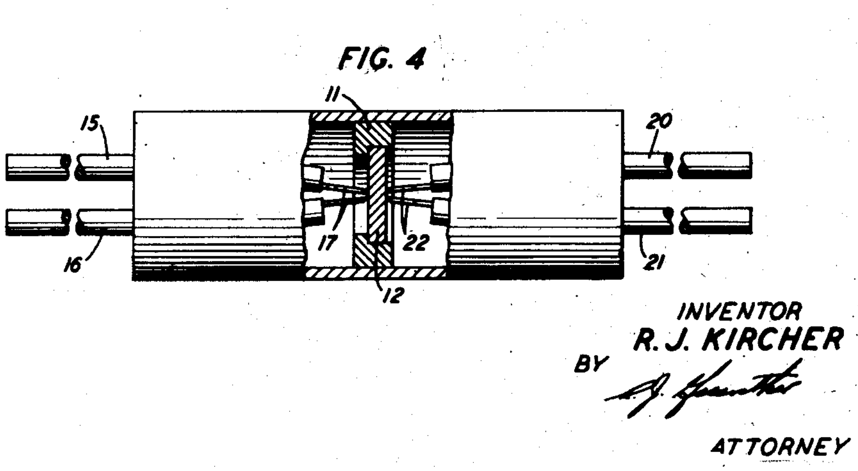
Fig. 4 is a view partly in section along line 4—4 of the device illustrated in Fig. 3.

The device illustrated in Figs. 3 and 4 is generally similar to that shown in Figs. 1 and 2 and described hereinabove but comprises instead of a single contact 19 a pair of contacts 22 similar to the contacts 17 and bearing against the opposite face of the disc or wafer 12 at a region thereof remote from the points of the contacts 17. Each pair of contacts 17 or 22, together with the body 12 and the base connection defined by the mounting ring 11, constitutes a triode amplifier. The two amplifier units are operable concurrently, for example, in cascade or in push-pull relation, without interaction through the body 12 between the two units.

Figure 5:
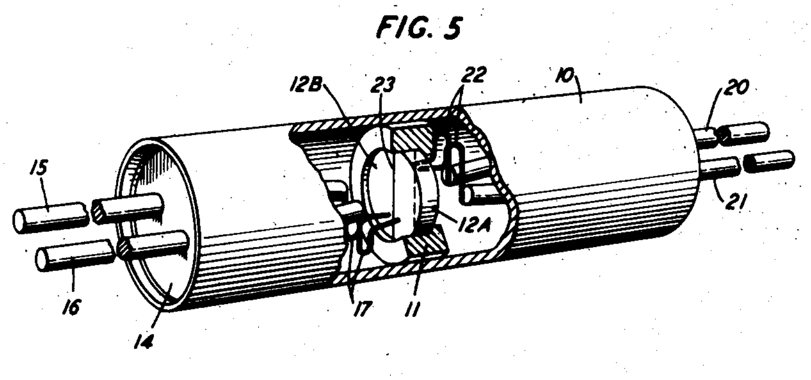
Fig. 5 is a perspective view of a device illustrative of still another embodiment of this invention, a portion of the housing and one of the internal elements being broken away to show the internal structure more clearly.

The device illustrated in Fig. 5, similarly to that shown in Figs. 3 and 4 described hereinabove, comprises two triode amplifier units. However, the semiconductive body has therein a grain boundary 23 which divides the body into two portions 12A and 12B. Each pair of contacts 17 and 22, serving as the emitter and collector of the respective amplifier unit, bear against the respective face of the body at points on opposite sides of the grain boundary 23 whereby, as disclosed in detail in the application, Serial No. 98,008, now Patent No. 2,623,103, filed June 9, 1949, of R. J. Kircher, the amplifier units have very low positive feedback impedance.

Figure 6:
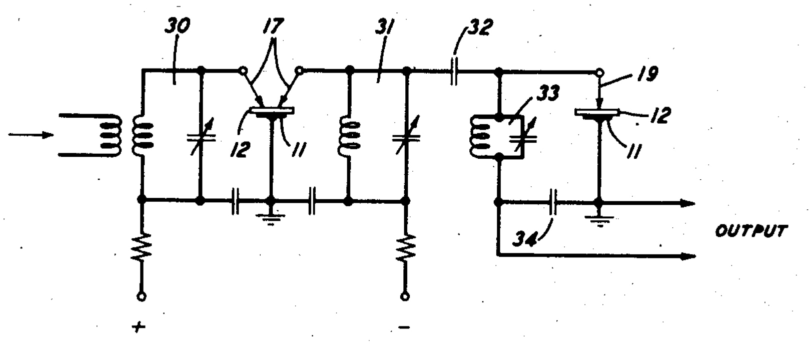
Fig. 6 is a circuit schematic illustrating one manner in which a device constructed in accordance with this invention may be utilized.

One manner in which the device shown in Figs. 1 and 2 and described hereinabove may be utilized is illustrated in Fig. 6. The unit, including the point contacts 17 and the base connection defined by the mounting ring 11, constitutes together with the semiconductor body 12 a radio frequency or intermediate frequency amplifier section. The tunable input circuit 30 is connected between one of the contacts 17 and the base connection 11 and a tunable output circuit 31 is connected between the other contact 17 and the base connection 11. In structures where the body 12 is of N-type material, the point contact 17 serving as the emitter is biased at a low positive potential, for example, of the order of one volt or less, relative to the base 11 and the contact 17 serving as the collector is biased negatively, for example of the order of 10 to 100 volts, relative to the base 11. As shown in Fig. 6, the base connection is grounded. The output of the amplifier unit is fed to the detector unit defined by the base connection 11 and the point contact 19 together with the body 12. The input circuit of the detector unit includes the tunable LC combination 33 and a radio frequency or intermediate frequency bypass condenser 34. An audio output is obtained as indicated.

Although specific embodiments of this invention have been shown and described, it will be understood that they are but illustrative and that various modifications may be made therein without departing from the scope and spirit of this invention. For example, although in the device illustrated in Figs. 1 and 2 a single point contact 19 is provided to define a single detector unit, two such contacts relatively widely spaced to prevent mutual interaction therebetween may be provided thereby to constitute with the body 12 and the base connection 11 a pair of detector units. Such pair of units may be electrically associated to define a push-pull detector stage coupled by external circuits to the amplifier unit of the device.

What is claimed is:

1. A signal translating device comprising a wafer of semiconductive material, an ohmic connection to said wafer adjacent the periphery thereof, point contact emitter and collector connections to one face of said wafer, and a point contact bearing against the opposite face of said wafer at a region thereof remote from said emitter and collector.

2. A signal translating device in accordance with claim 1 wherein said body is of germanium.

3. A signal translating device comprising a wafer of germanium, an ohmic base connection to said wafer adjacent the periphery thereof, means including said base connection and a pair of closely adjacent point contacts bearing against one face of said wafer defining therewith an amplifier, and means including said base connection and a point contact bearing against the opposite face of said wafer at a region remote from said pair of contacts, defining a rectifier.

4. A signal translating device comprising a body of semiconductive material, an ohmic connection to said body, a pair of closely adjacent point contacts bearing against one face thereof, and a second pair of closely adjacent points contacts bearing against the opposite face of said body at a region remote from said first contacts.

5. A signal translating device comprising a wafer of germanium, an ohmic connection to said wafer adjacent the periphery thereof, a pair of closely adjacent point contacts bearing against one face of said wafer, and a second pair of point contacts bearing against the opposite face of said wafer.

6. A signal translating device comprising a wafer of germanium having a grain boundary extending between the opposite faces thereof, an ohmic connection to said wafer adjacent the periphery thereof, a first pair of point contacts bearing against one of said faces on opposite sides of said boundary, and a second pair of point contacts bearing against the other of said faces on opposite sides of said boundary.

REYMOND J. KIRCHER.

References Cited in the file of this patent

UNITED STATES PATENTS

| Number | Name | Date |
|---|---|---|
| 2,438,893 | Bieling | Apr. 6, 1948 |
| 2,476,323 | Rack | July 19, 1949 |
| 2,486,776 | Barney | Nov. 1, 1949 |
| 2,502,479 | Pearson et al. | Apr. 4, 1950 |